United States Patent
Pidhorodetskyi et al.

(10) Patent No.: US 9,603,179 B1
(45) Date of Patent: Mar. 21, 2017

(54) GESTURE-BASED DATA EXCHANGE BETWEEN ELECTRONIC DEVICES

(71) Applicant: Limited Liability Company "Myco", Odesa (UA)

(72) Inventors: Roman Pidhorodetskyi, Vinnytsia (UA); Andrii Sydoruk, Derazhnia (UA); Andrii Papa, Vinnytsia (UA); Dmytro Kryvyi, Vinnytsia (UA)

(73) Assignee: The Limited Liability Company "Myco", Odesa (UA)

( * ) Notice: Subject to any disclaimer, the term of this patent is extended or adjusted under 35 U.S.C. 154(b) by 0 days.

(21) Appl. No.: 14/953,712

(22) Filed: Nov. 30, 2015

(30) Foreign Application Priority Data

Sep. 8, 2015 (UA) .................................. 201508693

(51) Int. Cl.
| | |
|---|---|
| *H04B 7/00* | (2006.01) |
| *H04W 76/02* | (2009.01) |
| *H04W 4/00* | (2009.01) |
| *G06F 1/16* | (2006.01) |

(52) U.S. Cl.
CPC ........ *H04W 76/023* (2013.01); *G06F 1/1694* (2013.01); *H04W 4/005* (2013.01)

(58) Field of Classification Search
None
See application file for complete search history.

(56) References Cited

U.S. PATENT DOCUMENTS

| | | | | |
|---|---|---|---|---|
| 7,339,484 | B2 * | 3/2008 | Pradhan ................ | H04W 48/08 340/538.15 |
| 2004/0003133 | A1 * | 1/2004 | Pradhan ................ | H04W 48/08 719/318 |
| 2012/0206262 | A1 * | 8/2012 | Grasso ................... | A63F 13/12 340/540 |
| 2014/0365979 | A1 * | 12/2014 | Yoon ...................... | G06F 3/017 715/863 |

* cited by examiner

*Primary Examiner* — Mohammed Rachedine
(74) *Attorney, Agent, or Firm* — Duane Morris LLP (57) ABSTRACT

A digital data transfer between two users' electronic devices such as cell phones, smartphones, tablet PCs, laptops, etc., is initiated by detecting both that the users' wrist-worn electronic data exchange units have been brought into proximity, and also that their on-board accelerometers sense movement consistent with a gesture, especially that two equipped users are shaking hands. The electronic data exchange units can communicate over a limited distance and can use Bluetooth. The data transfer can be arranged to be automatic without the attention of the users. The data transfer order is determined in part according to differences in the wait time for the two users' electronic devices to communicate with the respective data exchange units. The exchanged data can include user contact information to be stored via a smartphone application in a database.

16 Claims, 6 Drawing Sheets

GESTURE-BASED DATA EXCHANGE BETWEEN ELECTRONIC DEVICES

BACKGROUND

Field of the Invention

The invention relates to the field of microelectronics, in particular, to digital data transfer and may be used to exchange data between users of electronic devices, which may include cell phones, smartphones, tablet PCs, laptops, etc., using additional electronic data exchange units adapted for user wearing. More specifically, the invention discloses a method of data exchange between such electronic units initiated by users' gestures followed by data sending to users' electronic devices, data storage, processing, etc. In particular, the invention claimed may be applied at conferences, workshops and similar events to exchange contact details and other data between users, who wear electronic data units, e.g. wrist-worn units, and have a smartphone or any other similar device with a wireless communication module.

Description of Related Art

Similar methods are known in the art, and the closest to the invention claimed are described below:

Application EP 2302881 A1 published on Mar. 30, 2011 contains information on a method and a system for data exchange (including contact details) between mobile devices using NFC protocol when user devices are in proximity and repositioning thereof is captured by an accelerometer connected to a processor of the device.

U.S. Pat. No. 8,219,028 B1 published on Jul. 10, 2012 relates to data exchange between mobile devices when pre-defined events of various levels are captured by an accelerometer against a change in device positioning.

U.S. Pat. No. 8,370,501 B2 published on Feb. 5, 2013 describes a method of data exchange between devices when the search for devices to exchange data is triggered by a specific gesture of pre-defined gestures and establishing connection with those devices, to which the gesture is addressed to.

Application US 2004/0003133 A1 published on Jan. 1, 2004 relates to a method of communication between devices based on establishing connection between devices when an identical repositioning thereof is captured (in particular, at handshaking).

Application US 2011/0081923 A1 published on Apr. 7, 2011 also discloses a method of data transfer from a mobile device by an accelerometer which identifies a specific movement over a screen of a mobile device and sends data in response.

Application US 2011/0088002 A1 published on Apr. 14, 2011 discloses a method of content transfer from one mobile device to another using a software application installed thereon, that captures device repositioning, described as pre-defined movements, and transfers data to the device.

Application US 2012/0128154 A1 published on May 24, 2012 discloses a method of establishing encrypted connection between devices, including data exchange with keys in audio spectrum in close proximity of devices, and establishing connection between thereof after key exchange.

Application US 2012/0206262 A1 published on Aug. 16, 2012 discloses data exchange between devices, wherein an event, common for two devices, such as handshaking, triggers identification of devices and data exchange therebetween.

Application US 2012/0317024 A1 published on Dec. 13, 2012 discloses a device having a set of sensors, including an accelerometer, which are used to capture a change in a specific parameter of the parameter set and to transfer data whenever those parameters coincide.

Application US 2013/0169571 A1 published on Jun. 4, 2013 discloses a method of data exchange between mobile devices preferably by gestures on touchscreens and a separate server to pair the two devices.

International Application WO 2011/119499 A2 published on Sep. 29, 2011 contains information about a method of certain movement capturing of a device by motion sensors and receiving an incoming signal and performing actions (in particular, data transfer) depending on the time between motion capture and signal receipt.

International Application WO 2014/205201 A1 published on Dec. 24, 2014 discloses a method description of data exchange between two devices when they are in physical proximity by capturing specific physical parameters by each device provided the parameters are stored thereon.

International Application WO 2015/099954 A1 published on Jul. 2, 2015 discloses data exchange between two devices via wireless communication channels when data, including an identifier, are sent from either device.

Methods of data exchange between users via mobile devices being in close proximity to each other and performing specific gestures to initiate data transfer are known in the art from Lars Erik Holmquist, Friedemann Mattern, Bernt Schiele, Petteri Alahuhta, Michael Beigl and Hans-W. Gellersen: Smart-Its Friends: A Technique for Users to Easily Establish Connections between Smart Artefacts (published on Oct. 16, 2001), Nicolai Marquardt, Till Ballendat, Sebastian Boring, Saul Greenberg, Ken Hinckley: Gradual Engagement: Facilitating Information Exchange between Digital Devices as a Function of Proximity (published in Proceedings of the 2012 ACM international conference on Interactive tabletops and surfaces, ACM New York, N.Y., USA ©2012, Pages 31-40).

Application EP 2813921 A1 published on Dec. 17, 2014 discloses a communication service method and devices, based on data exchange between devices, being in users' hands by establishing a communication channel between the devices when the first and second device repositioning factors of a group of pre-defined positions (e.g. handshaking) are captured (specification, [0073]).

The closest to the proposed solution is a data exchange method, disclosed in International Application WO 2015/094220 A1 published on Jun. 25, 2015, which discloses the data exchange process between user-worn devices in response to capturing an event pre-defined as a data exchange request when devices come in proximity. The data exchange process between identical electronic devices is triggered by pre-search for user electronic device by another similar device for further data exchange, capturing a greeting event, in particular, by handshaking, followed by sending a message of other electronic device identification, waiting for confirmation from the other electronic device, selecting data by a user on his/her electronic device to be transferred, transferring data to another electronic device, receiving a data transfer request from the other electronic device, and transferring data from the other electronic device upon request confirmation. A handshaking event is captured in two steps: device positioning in certain proximity and users' greeting by a greeting event, in particular, by handshaking.

All solutions described hereinabove allow to exchange data between user electronic devices; however these solutions require either a software application pre-installed and run on a user electronic device followed by specific actions (gestures etc.), or a pre-search for similar devices in a certain radius, identification of devices intended to exchange data therebetween and subsequent data exchange.

SUMMARY OF THE INVENTION

This invention aims to provide a method of data exchange between user electronic devices using additional user-worn electronic units when a handshaking event is captured, and initiation of data transfer between electronic units and between an electronic unit and a corresponding user electronic device is simplified by changing the sequence of steps to be taken to facilitate initiation and by introducing further steps in relation to capturing a handshaking event. A further objective of the invention is to improve data transfer accuracy by transferring data only between the devices which are intended for data transfer.

This task is solved so that, according to the claimed method of gesture-based data exchange between electronic devices, a user electronic device is connected wirelessly to at least one data exchange electronic unit, a handshaking event is captured by at least two electronic data exchange units, wireless connection of the user electronic device to the electronic data exchange unit which captured the handshaking event is interrupted, radio spectrum is scanned by at least one data exchange electronic unit, which captured the handshaking event, to establish radio communication with the other electronic data exchange unit, which captured the handshaking event, wait time is defined for electronic data exchange units which captured the handshaking event, data from the electronic data exchange unit having shorter wait time is transferred to the electronic data exchange unit having longer wait time through a radio channel of the data unit with shorter wait time, the electronic data exchange unit with longer wait time receives data, data from the electronic data exchange unit with longer wait time is transferred to the electronic data exchange unit with shorter wait time through a radio channel of the electronic data exchange unit with longer wait time, the electronic data exchange unit with shorter wait time receives data, the user electronic device connects wirelessly to the electronic data exchange unit, which captured the handshaking event, electronic data exchange units, which captured the handshaking event, transfer data to the user electronic device connected to the electronic data exchange unit.

The above series of steps triggers data exchange between electronic data exchange units once the handshaking event is captured, i.e. there is no pre-search for devices for data exchange by sending an invitation with subsequent capture of an event triggering device identification for data exchange and data transfer thereto as described in WO 2015 094220 A1 and EP 2813921 A1 known in the art. This sequence of steps simplifies the data transfer method significantly. According to the method claimed, users' hand contact and gravitational acceleration of each electronic data exchange unit are captured to trigger data exchange. This is possible only in a handshaking event wherein users' hands come to appropriate proximity (so the first key event factor is captured) and are accelerating from 10 g to 0 (so the second key event factor is captured). Therefore, the event is captured in a clear and unambiguous manner by an accelerometer, installed on every electronic data exchange unit, so that data transfer is triggered between the devices specifically intended for data transfer and a faulty operation of units is prevented. A user takes no further steps to trigger data transfer, except for establishing a wireless connection between his/her electronic device, e.g. a smartphone, and a user-worn electronic data transfer unit, e.g. a wrist-worn one, and shaking hands with another user, whose electronic device is intended for data exchange. Here, the data exchange method is simplified significantly compared to methods known in the prior art, wherein, to trigger a data transfer process, either the surrounding area is pre-scanned to search for similar electronic devices followed by selection of the target device for data transfer, that appears to be difficult when many devices are positioned in certain proximity, or a particular software application is installed on all electronic devices intended for data exchange (making it difficult or impossible to exchange data when such application is not installed), such application runs and specific steps are taken by a user (such as approaching electronic devices, in particular, as required by Near Field Communication (NFC) technology, in particular, as disclosed by EP 2 302 881 A1, touching or pushing devices against each other as disclosed in WO 2011 119499 and implemented using Bump application, https://en.wikipedia.org/wiki/Bump_(application) etc.).

In one embodiment, a handshaking event may be captured by at least two electronic data exchange units by capturing users' contact of hands with electronic data exchange units worn followed by capturing gravitational acceleration by electronic data exchange units. As described above, this enhances accuracy of identification of an event triggering the electronic data exchange unit to transfer data to another electronic data exchange unit which captured the similar event.

In another embodiment, users' hand contact and gravitational acceleration may be captured by accelerometers, installed on electronic data exchange units, which function as a data transfer regulator and capture the handshaking event to trigger data transfer.

In yet another embodiment, a radius of radio frequency spectrum scanning may be pre-defined by the electronic data exchange unit. The area to be scanned by the electronic data exchange unit is limited approximately to the length of a user's hand, so that the chance that another unit or device may be connected through a radio channel with the radio frequency spectrum coinciding with that of the data exchange unit is limited.

In yet another embodiment, the user electronic device may be connected wirelessly to the electronic data exchange unit via Bluetooth, whereby transfer of data received by the electronic data unit to the user electronic device is further simplified and any mobile device equipped with a Bluetooth-based data transfer means may be used as such device.

In yet another embodiment, data saved on the electronic data exchange unit is transferred to provide for data exchange between electronic units in the mode of interrupted wireless connection between the user electronic device and his/her electronic unit, so that a user does not need to choose data on his/her electronic device (a smartphone) to be transferred and, in combination with the steps described above, this ensures a completely automatic data exchange between users when no further step is taken.

According to the previous embodiment, storage of data intended for further transfer by the electronic data exchange unit may be done during the first wireless connection of the user electronic device to the electronic data exchange unit, whereby the data transfer method is further simplified as a user does not choose data to be exchanged anymore and data are transferred automatically once a handshaking event has been captured as described above.

In yet another embodiment, data storage, wireless connection of the user electronic device to the electronic data exchange unit and radio frequency spectrum scanning by the electronic data exchange unit may be done by a processor, installed on the electronic data exchange unit, whereby the method claimed is performed and the structure of the electronic unit intended for implementation thereof is thus simplified, that is particularly important for small wrist-worn units.

In yet another embodiment, data received from at least one user electronic device may further be transferred to at least one server connected via the Internet and data so received may further be stored by at least one server using at least one database, whereby data storage and further data processing are done not only by the user electronic device (a smartphone) receiving data from the electronic unit, but also by other devices, which may have access to the said server and database, in particular, a remote access by the user or other users to data saved, e.g. via the Internet using cloud technologies etc.

In yet another embodiment, data may be received by user electronic devices from the electronic data exchange unit and may be transferred from the user electronic device to a server using a software application installed on the user electronic device whereby, in addition to data receipt, data are then reviewed on the user electronic device, processed and sent to other users, etc.

In yet another embodiment, a cell phone, a smartphone, a tablet PC, a laptop, equipped with Bluetooth wireless communication technology, may be used as a user electronic device, whereby the electronic device is connected to the electronic data unit and data is received from the latter.

In yet another embodiment, a wrist-worn bracelet may be used as an electronic data exchange unit, so that such bracelet captures a handshaking event between two users having such wrist-worn electronic units in a reliable and accurate manner.

In yet another embodiment, data on users' hand contact capture and gravitational acceleration capture may be transferred from an accelerometer to a processor through a data bus line I2C, installed on electronic data exchange units, whereby a processor receives information on the handshaking event from the accelerometer on wrist-worn electronic units in a reliable manner.

BRIEF DESCRIPTION OF THE DRAWINGS

The invention claimed is illustrated by the following exemplary embodiment of the data exchange method and the electronic data exchange unit for implementation thereof and by the figures described below, specifically:

DETAILED DESCRIPTION OF THE INVENTION

Materials that illustrate the invention claimed as well as an example of specific embodiment of the method and the electronic data exchange unit do not restrict the scope of the appended claims in any way, but are intended to better explain the essence of the invention.

Figure 1:
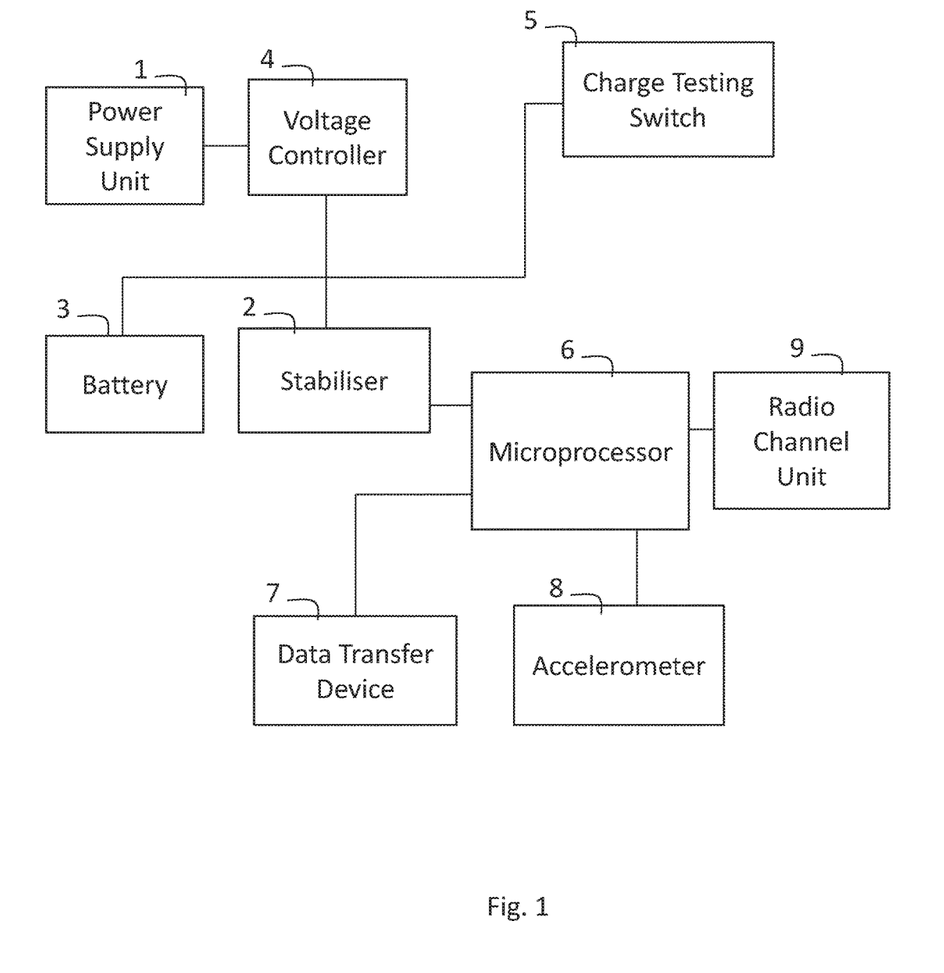
FIG. 1 is a general flowchart of the electronic data exchange unit.
Figure 2:
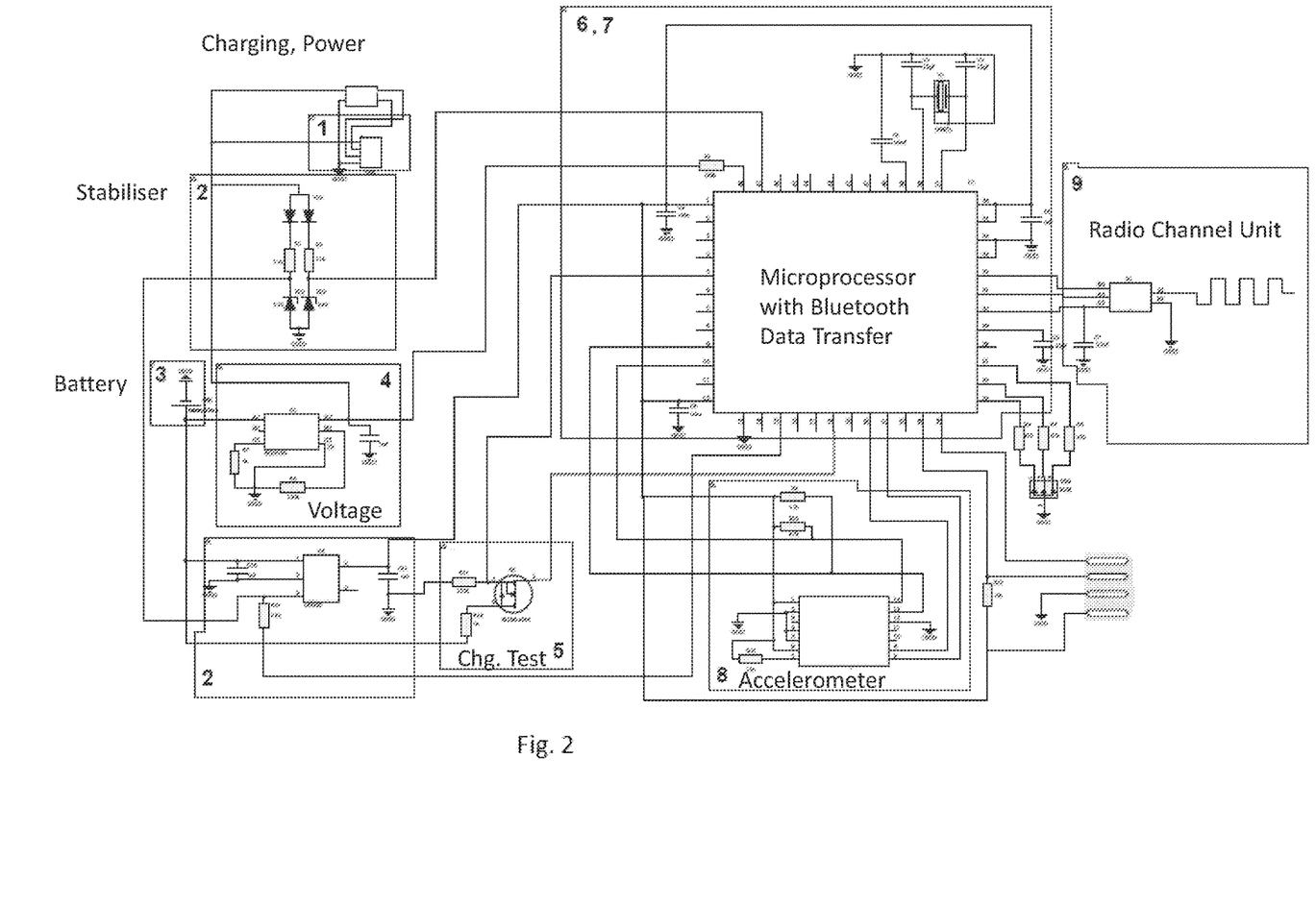
FIG. 2 is a basic flowchart of an electronic data exchange unit including modules described by the flowchart on FIG. 1.

The electronic data exchange unit comprises modules, such as charging and power supply unit 1, stabiliser 2, battery 3, voltage controller 4, charge testing switch 5, microprocessor 6 with Bluetooth wireless data transfer device integrated therein 7, accelerometer 8 and radio channel unit 9 (according to FIG. 1, which is a general flowchart of an electronic data exchange unit, and FIG. 2, which is a basic flowchart of an electronic data exchange unit showing separate functional modules thereof according to FIG. 1). Microprocessor 6 is connected to the stabiliser 2, charge testing switch 5, accelerometer 8 and radio channel unit 9. Stabiliser 2 is connected to battery 3, voltage controller 4 and charge testing switch 5. Voltage controller 4 is connected to charging and power supply unit 1.

Charging and power supply unit 1 comprises a USB port to supply power to voltage controller 4, which regulates charge of battery 3. Voltage is further supplied to stabiliser 2 to reduce voltage to the level required, so that the entire circuit of the electronic data exchange unit is powered. The electronic data exchange unit is switched on for the first time with a USB port, and the unit is subsequently powered by battery 3.

Stabiliser 2 is configured to maintain the stable level of input voltage irrespective of voltage changes in battery 3 coming to the entry point of the electronic data exchange unit. Stabiliser 2 also helps to regulate the first switch-on of the electronic data exchange unit, i.e. before the unit is switched on for the first time, it is powered using a USB port rather than a battery since an exit point of the stabiliser is closed. When the unit is switched on for the first time to any device having a USB port capable to power the unit, opening voltage is supplied to the stabiliser, so that the processor is switched on and the logical level is automatically set at either entry point to maintain the stabiliser in an open state for further use of the unit.

Voltage controller 4 functions as a charge regulator for battery 3. When battery 3 is charged, current flows to battery 3 through voltage controller 4, and current, where necessary, may be limited by voltage controller 4. When battery 3 is fully charged, saturation voltage starts flowing through a microcircuit and, when it leaks, voltage controller 4 disconnects battery 3 from the charging unit.

Charge testing switch 5 is configured, so that microprocessor 6 can check the level of charge of battery 3. Switch 5 is in a standby mode. When the level of charge is to be defined, a logical level is established at either outlet of microprocessor 6, so that the processor could immediately obtain information on the charge level of battery 3. Further, logical 0 is set at microprocessor inlet, so that switch 5 switches to a standby mode. This saves power to be consumed by the unit from the battery.

Figure 4:
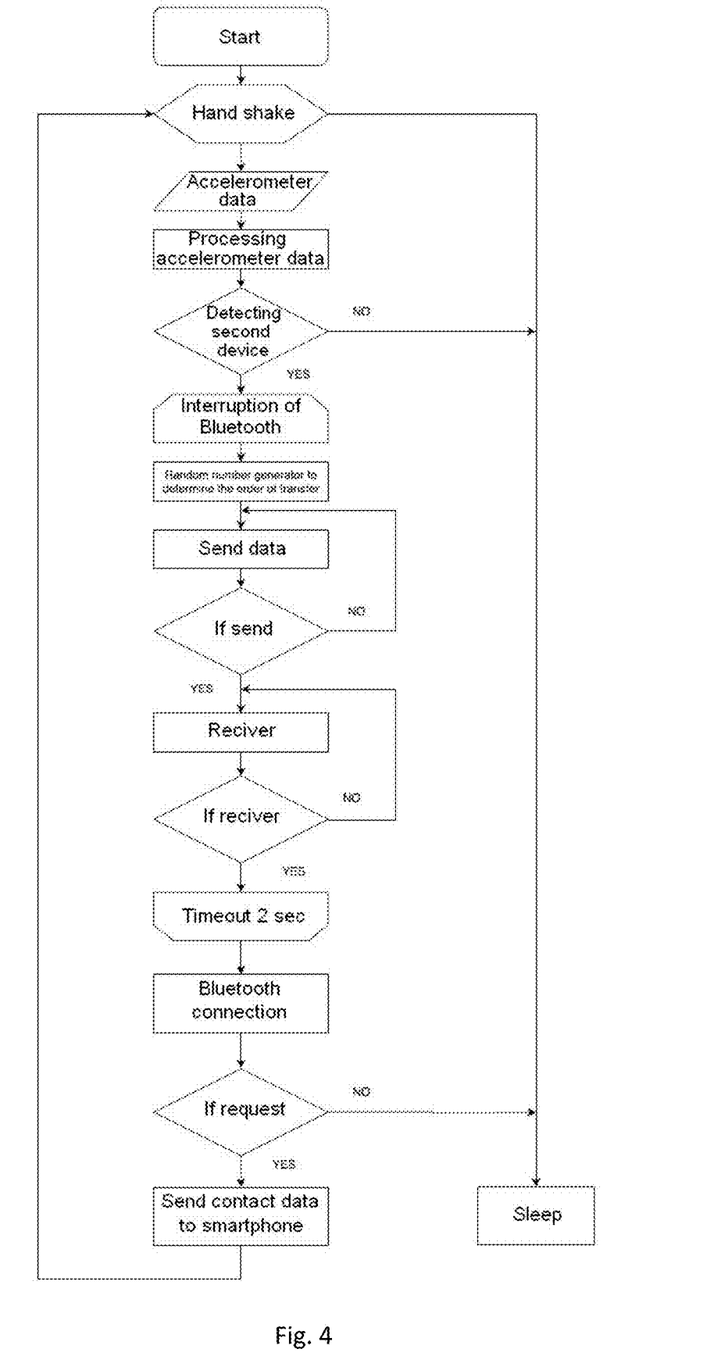
FIG. 4 is a data exchange process algorithm, implemented by a microprocessor in an electronic data exchange unit.

Microprocessor 6 is used to control and commutate all functional modules, as described above, and switched consequently to ports thereof, between each other and to the user electronic device, e.g. a smartphone. The sequence of necessary functions and data processing follow the algorithm described on FIG. 4. Standardised commands used by microprocessor 6 ensure coordinated functioning of the above modules of the unit and a smartphone. A chip of microprocessor 6 comprises integrated Bluetooth units 7 and radio channel unit 9.

Integrated Bluetooth unit is designated to transfer data between the electronic data transfer unit and the user electronic device, e.g. a smartphone. It may also be configured, so that the unit is controlled and set up from the user electronic device.

Radio channel unit 9 functions as a direct transmitter and receiver of information between electronic data exchange units. The main part of radio channel unit 9 is integrated in the chip of microprocessor 6, and the outer part of radio channel unit 9 comprises a system having capacitors, inductors and antennas configured to allow data transfer between electronic data exchange units within 10 m.

The method for gesture-based data exchange between electronic devices using electronic data exchange units, as described above, is implemented as follows (see FIG. 3).

Figure 3:
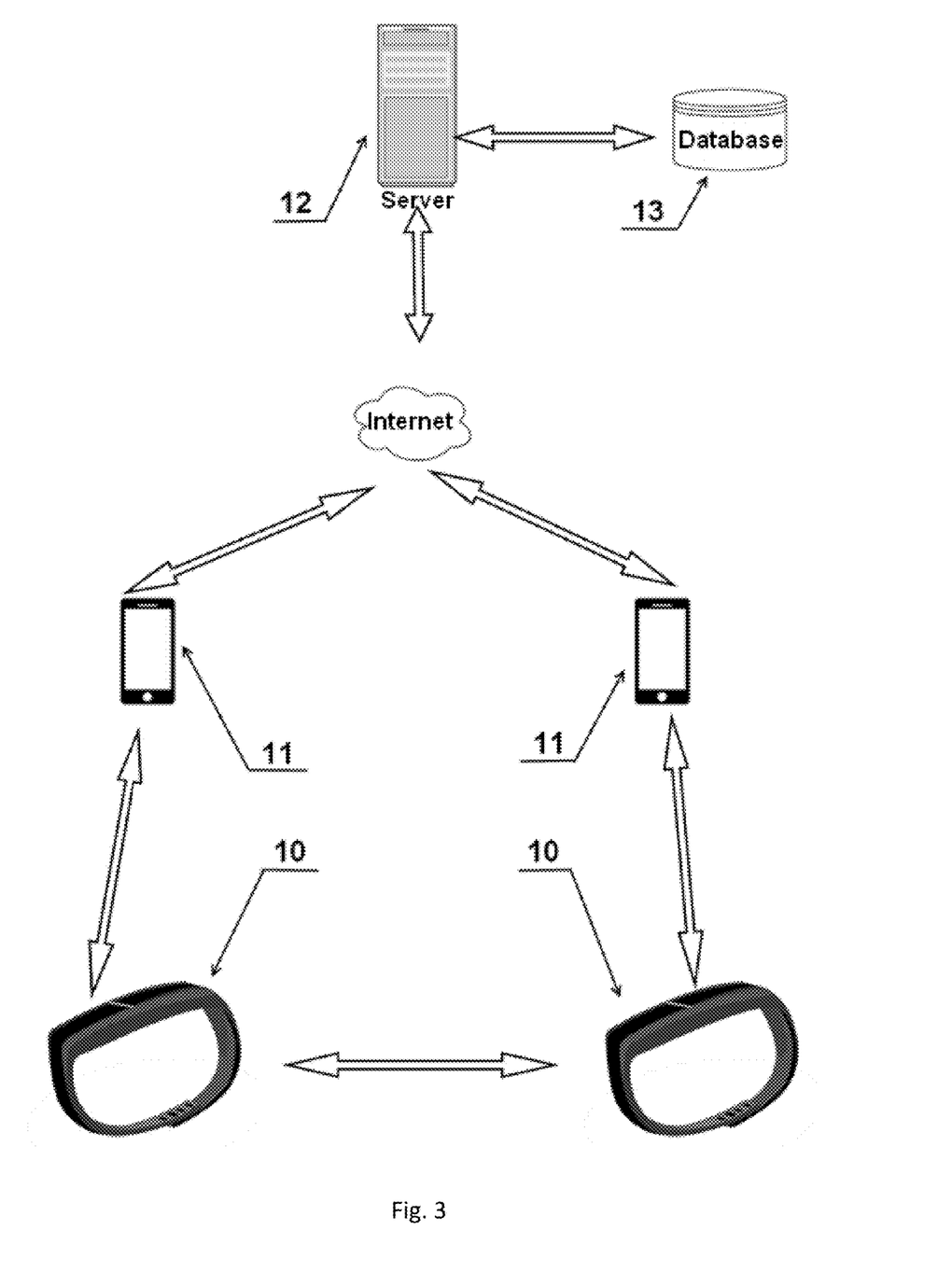
FIG. 3 is a flowchart for a data exchange process between user electronic devices followed by data storage on a server or in a database.

By default, electronic data exchange unit 10 is connected to the corresponding user electronic device 11, e.g. a smartphone, via Bluetooth. Once accelerometer 8 identifies a handshaking event by successive capture of two factors in the manner described above, microprocessor 6 receives a handshaking event capture signal. This triggers an interruption at microprocessor 6, and microprocessor 6 switches off Bluetooth unit 7, and switches on radio channel unit 9 to transfer data. The transfer code is identical for all electronic units 10. Electronic unit 10 scans the area within a radius of 30 cm (pre-set) and, once another electronic unit 10 intended for data exchange, as automatically determined by capturing the handshaking event by another unit 10, is identified, processors of both units 10 randomly set the wait time for radio channel unit 9 to determine the order of transferring and receiving information between units 10. As the wait time set on one unit 10 differs from that on the other unit 10, the first unit 10 having shorter wait time (ends earlier) is configured to transfer data, and, accordingly, the other unit 10 receives information and is configured to receive data through a radio channel. Once data has been received, units 10 change their 'data receipt/transfer' mode to the opposite one, so that units 10 exchange data using a radio channel once again. Testing of the method demonstrates that the entire data exchange process takes approximately 4 seconds. If no data exchange occurs over this time, i.e. no data was received by both units 10, false data exchange is captured, and microprocessor 6 turns off radio channel unit 9 and turns on Bluetooth unit 7 to connect with smartphone 11. Data between electronic units 10 and between electronic unit 10 and the corresponding user electronic device 11 may be transferred by packets, so that the total amount of data is divided by portions (packages), which are consistently transferred and gathered into one set of data on user electronic device 11. This further increases data exchange rate and enhances reliability of data receipt by user electronic device 11.

Data to be transferred may include user contact information or any other information, as may be required by a user, pre-recorded in unit 10 using smartphone 11 as described above. Data may be recorded in unit 10, so that a certain memory area of microprocessor 6 of unit 10 is allocated and is enough to store such data or may be recorded by other means, known in the art.

Figure 5:
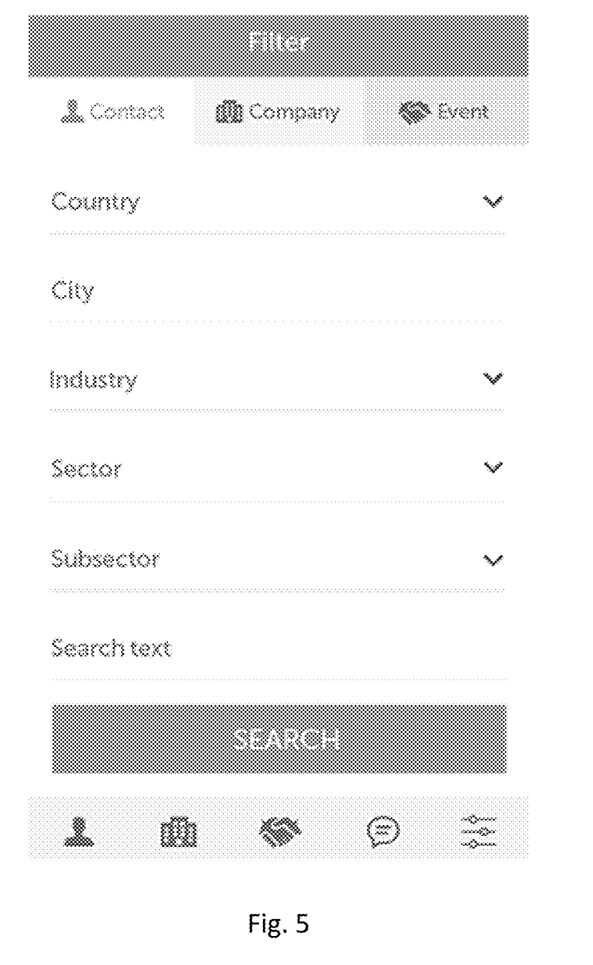
FIG. 5 is a screen showing a user smartphone interface in a search mode.
Figure 6:
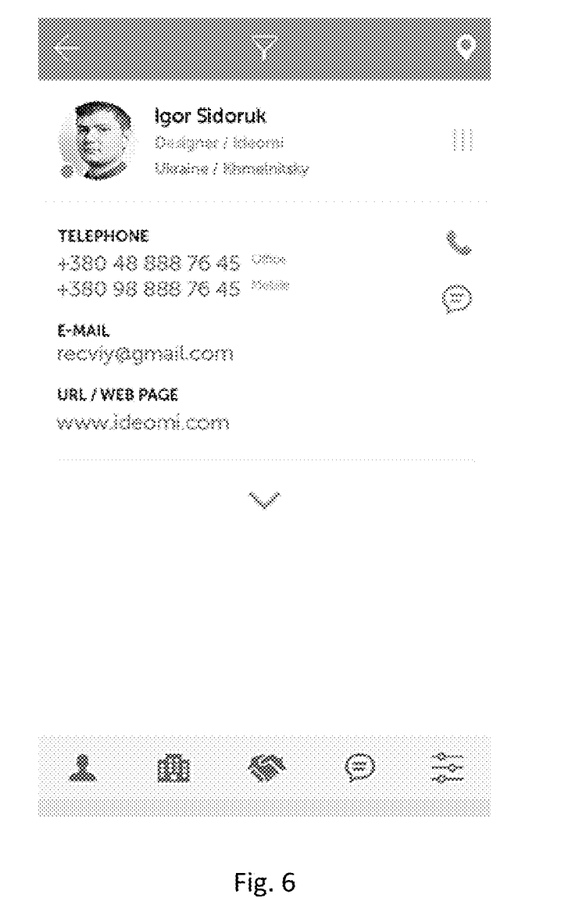
FIG. 6 is a screen showing a user smartphone interface displaying received contact information.

A software application installed on user electronic device 11, e.g. a smartphone, is designed to display and process user's profile details and contact list, e.g. to add, delete data or block access to data. Further, the software application may be designed, so that to allow access to professional social network via the Internet and to synchronise data received with that of user's profile and to allow communication through network chatting. The software application uses electronic unit 10, in particular, in a form of a wrist-worn bracelet and is controlled through Bluetooth. An example of software application interface with functions described above is shown in FIGS. 5 and 6, where FIG. 5 demonstrates a user smartphone interface with the software application being in the search mode and sorting contacts by various parameters, and FIG. 6 demonstrates a user smartphone interface with the software application displaying certain contacts received by the method described above.

When data received from user electronic unit 11 is transferred to server 12 using the software application described above, a server-end portion of the software application installed on server 12 is used. The server-end portion is designed to perform application processes associated with processing and storage of data received by the user, to interact with user electronic units 11 and respond to requests thereof as well as to interact with database 13 with an option to choose data intended for further processing. Further, cloud technologies may be used to store incoming data.

A prototype model of unit 10 is built on microprocessor NRF51822, designed to implement joint operation of all modules of unit 10, shown on FIGS. 1 and 2. Operation of these modules is software-coordinated and is based on the algorithm demonstrated on FIG. 4.

Unit 10 may be powered by lithium-ion battery 3 with the capacity of 80 mA. To prevent burning of the battery, voltage controller 4, designed with a microchip BQ25100, may be used. Once battery 3 is fully charged, voltage controller 4 disconnects battery 3 from the charger. Stabiliser 2 used to lower and stabilise power supply can be designed with LP3990, which provides necessary voltage and protects the circuit of unit 10 from any changes in input voltage.

Charge testing switch 5 may be designed on a field-effect transistor. It serves to test the charge level of battery 3 with microprocessor 6 in order to save power for unit 10.

Accelerometer 8 may be designed using microchip ADXL345. When unit 10 repositions in the space within the appropriate range, accelerometer 8 sends coordinates to microprocessor 6, which processes such information and, accordingly, depending on the range of coordinates so obtained, decides whether to capture a handshaking event and transfer data. If the information on coordinates obtained meets decision-making requirements, data is transferred between units 10 using with microprocessor 6 built in a chip of the radio channel unit 9 at a frequency of 2.4 GHz. Information is then exchanged between unit 10 and smartphone 11 via Bluetooth unit, which is also built in into the processor chip.

The solution to this problem can be implemented by the radio channel of the processor, which is used to transfer information at a frequency of 2.4 GHz. Data is transferred between unit 10 and smartphone 11 using Bluetooth unit, integrated in the chip of microprocessor 6.

Unit 10 may be designed preferably in the form of a wrist-worn bracelet and may further comprise LED indication for data transfer, charge/discharge of battery 3 and switching on unit 10. The unit may be powered from battery 3, charged with, e.g., a USB-port.

What is claimed is:
1. A method of gesture-based data exchange between electronic devices comprising:
   wireless connection of a user electronic device to at least one electronic data exchange unit, capture of a handshake between two users forming a handshaking event, by the electronic data exchange unit and by at least one other electronic data exchange unit, interruption of the wireless connection of the user electronic device to the electronic data exchange unit, scanning of a radio spectrum by at least one of the electronic data exchange unit and the other electronic data exchange unit, each of which electronic data exchange units having captured the handshaking event, to establish radio communication between the electronic data exchange unit and the other electronic data exchange unit, definition of a wait time for the electronic data exchange units, which captured the handshaking event, data transfer from one of the electronic data exchange units having a shorter wait time to another one of the electronic data exchange units having a longer wait time through a radio channel of the electronic data exchange unit with shorter wait time, receipt of data from the electronic data exchange unit with longer wait time, data transfer from the electronic data exchange unit with longer wait time to the electronic data exchange unit with shorter wait time through a radio channel of the electronic data exchange unit with longer wait time, receipt of the data transfer by the electronic data exchange unit with shorter wait time, wireless connection of the user electronic device to the electronic data exchange unit, which captured the handshaking event, data transfer from electronic data exchange units, which captured the handshaking event, to the user electronic device connected to the electronic data exchange unit.

2. The method of claim 1, wherein the handshaking event is captured by the at least two electronic data exchange units by capturing users hand contact with the electronic data exchange units while worn followed by capture of gravitational acceleration by the electronic data exchange units.

3. The method of claim 2, wherein users' hand contact and gravitational acceleration are captured by accelerometers, installed on the electronic data exchange units.

4. The method of claim 2, wherein a radius of scanning of the radio frequency spectrum by the electronic data exchange units is pre-set.

5. The method of claim 1, wherein the user electronic device is connected wirelessly to the electronic data exchange unit via Bluetooth.

6. The method of claim 1, wherein data saved on the electronic data exchange unit is transferred.

7. The method of claim 6, wherein data is saved for further transfer by the electronic data exchange unit during a first wireless connection of the user electronic device to the electronic data exchange unit.

8. The method of claim 1, wherein data storage, wireless connection of the user electronic device to the electronic data exchange unit and scanning of the radio frequency spectrum by the electronic data exchange unit are done by a processor, installed on the electronic data exchange unit.

9. The method of claim 1, wherein data received is further transferred from at least one user electronic device to at least one server connected via the Internet.

10. The method of claim 9, wherein data received is further stored by at least one server using at least one database.

11. The method of claim 10, wherein receipt of data by user electronic devices from electronic data exchange units and transfer of incoming data from the user electronic device to the server are done with a software application, installed on user electronic devices.

12. The method of claim 11, wherein at least one of the user electronic devices comprises one of a cell phone, a smartphone, a tablet PC, and a laptop equipped with Bluetooth wireless communication technology.

13. The method of claim 11, wherein a wrist-worn bracelet is used as the electronic data exchange unit.

14. The method of claim 8, wherein data on users' hand contact capture and gravitational acceleration capture is transferred from an accelerometer to a processor through a data bus line installed on the electronic data exchange unit.

15. The method of claim 9, wherein receipt of data by user electronic devices from electronic data exchange units and transfer of incoming data from the user electronic device to the server are done with a software application, installed on user electronic devices.

16. The method of claim 5, wherein at least one of a cell phone, a smartphone, a tablet PC, a laptop equipped with Bluetooth wireless communication technology is used as the user electronic device.

* * * * *